United States Patent [19]
Crayton et al.

[11] Patent Number: 5,319,973
[45] Date of Patent: Jun. 14, 1994

[54] ULTRASONIC FUEL LEVEL SENSING DEVICE

[75] Inventors: John W. Crayton, Washington; Timothy A. Boston, Tremont, both of Ill.; David A. Betts, Eufaula, Ala.

[73] Assignee: Caterpillar Inc., Peoria, Ill.

[21] Appl. No.: 12,175

[22] Filed: Feb. 2, 1993

[51] Int. Cl.$^5$ .............................................. G01F 23/28
[52] U.S. Cl. .............................. 73/290 V; 367/908; 367/99; 181/124; 73/292; 73/322.5
[58] Field of Search .................... 73/290 V, 292, 322.5; 367/908, 108, 99; 181/123, 124, 400, 402

[56] References Cited

U.S. PATENT DOCUMENTS

| | | | |
|---|---|---|---|
| 3,693,445 | 9/1972 | Johnson | 73/290 V |
| 4,229,798 | 10/1980 | Rosie et al. | 73/290 V |
| 4,531,406 | 7/1985 | Fritz | 73/292 |
| 4,715,226 | 12/1987 | Dorr | 73/290 V |
| 4,829,493 | 5/1989 | Bailey | 367/111 |
| 4,853,694 | 8/1989 | Tomecek | 73/290 V |
| 4,873,676 | 10/1989 | Bailey et al. | 367/98 |
| 4,909,080 | 3/1990 | Kikuta et al. | 73/290 V |
| 5,027,655 | 7/1991 | Sweet | 73/290 V |
| 5,065,624 | 11/1991 | Fell | 73/292 |
| 5,076,101 | 12/1991 | Lazure | 73/290 V |
| 5,095,748 | 3/1992 | Gregory et al. | 73/290 V |
| 5,127,266 | 7/1992 | Maresca et al. | 73/290 V |
| 5,184,510 | 2/1993 | Rossman | 73/290 V |

FOREIGN PATENT DOCUMENTS

| | | |
|---|---|---|
| 2433133 | 2/1975 | Fed. Rep. of Germany . |
| 3330059 | 2/1985 | Fed. Rep. of Germany . |
| 3706453 | 9/1988 | Fed. Rep. of Germany . |
| 2152667 | 8/1985 | United Kingdom ............. 73/290 V |
| 0069024 | 5/1980 | Japan ................................. 73/290 V |
| 90/10849 | 9/1990 | PCT Int'l Appl. . |
| 0436241 | 11/1974 | U.S.S.R. ............................ 73/290 V |

*Primary Examiner*—Diego, F. F. Gutierrez
*Attorney, Agent, or Firm*—David M. Masterson

[57] ABSTRACT

In one aspect of the present invention, an apparatus for measuring the height of liquid contained in a storage tank is disclosed. A tube is disposed inside the tank. A float is disposed inside the tube and is buoyed on the surface of the liquid. An ultrasonic transducer is disposed inside the tube. The ultrasonic transducer emits ultrasonic pulses toward the float, receives the reflected ultrasonic pulses, and responsively produces an echo signal. The float has a top portion and a bottom portion separated by a cylindrical portion. The bottom portion including an spherical surface which receives the ultrasonic pulses. The spherical surface has a predetermined radius which is a function of the inside diameter of the tube, the height of the cylindrical portion of the float and the outside diameter of the cylindrical portion of the float. A temperature sensor monitors the temperature of the liquid and produces a thermometric signal in response to the liquid temperature. A microprocessor receives the echo and thermometric signals, determines the speed of the ultrasonic pulse traveling in the liquid, and responsively determines the liquid height.

11 Claims, 4 Drawing Sheets

Fig_1_

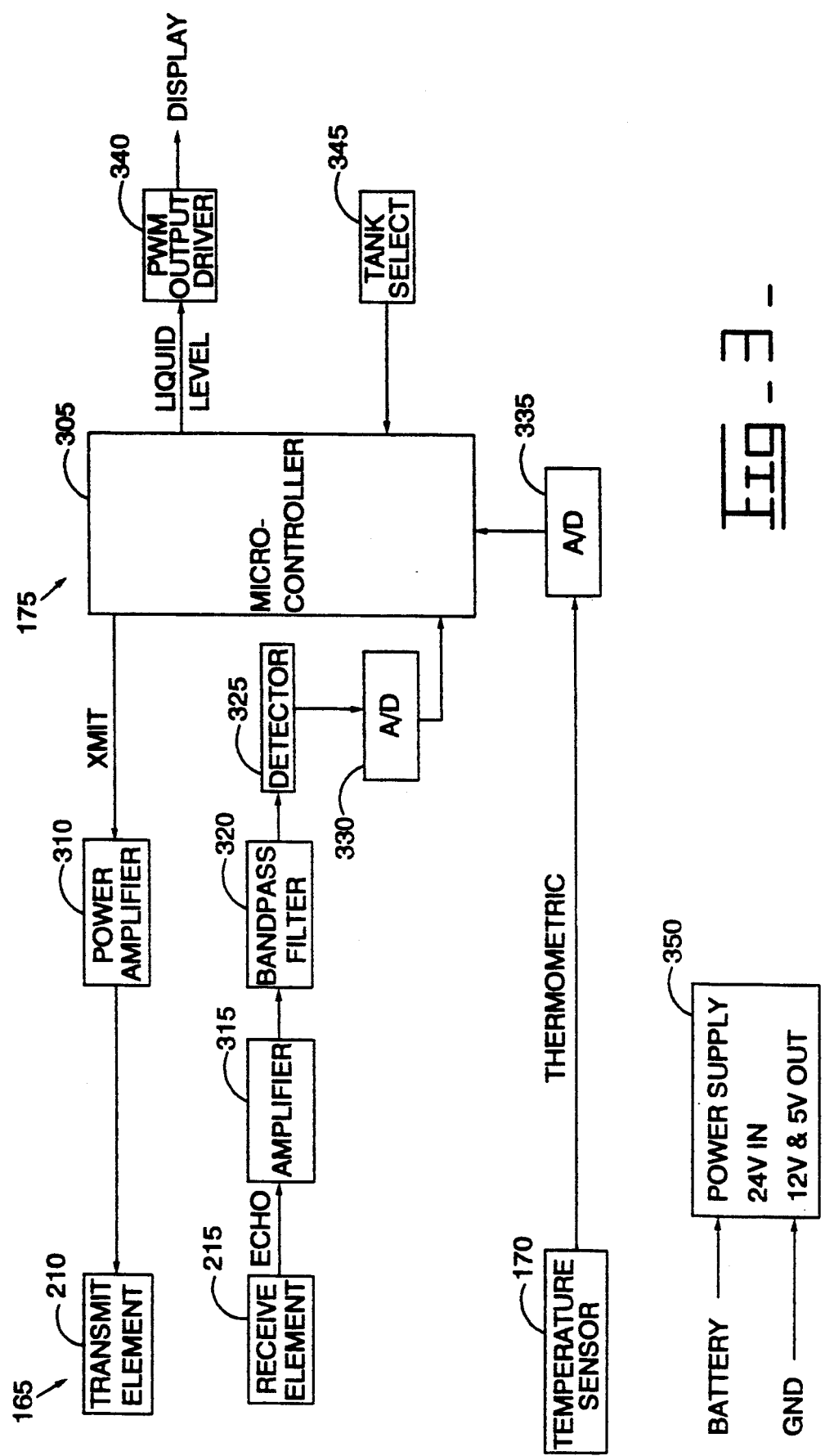

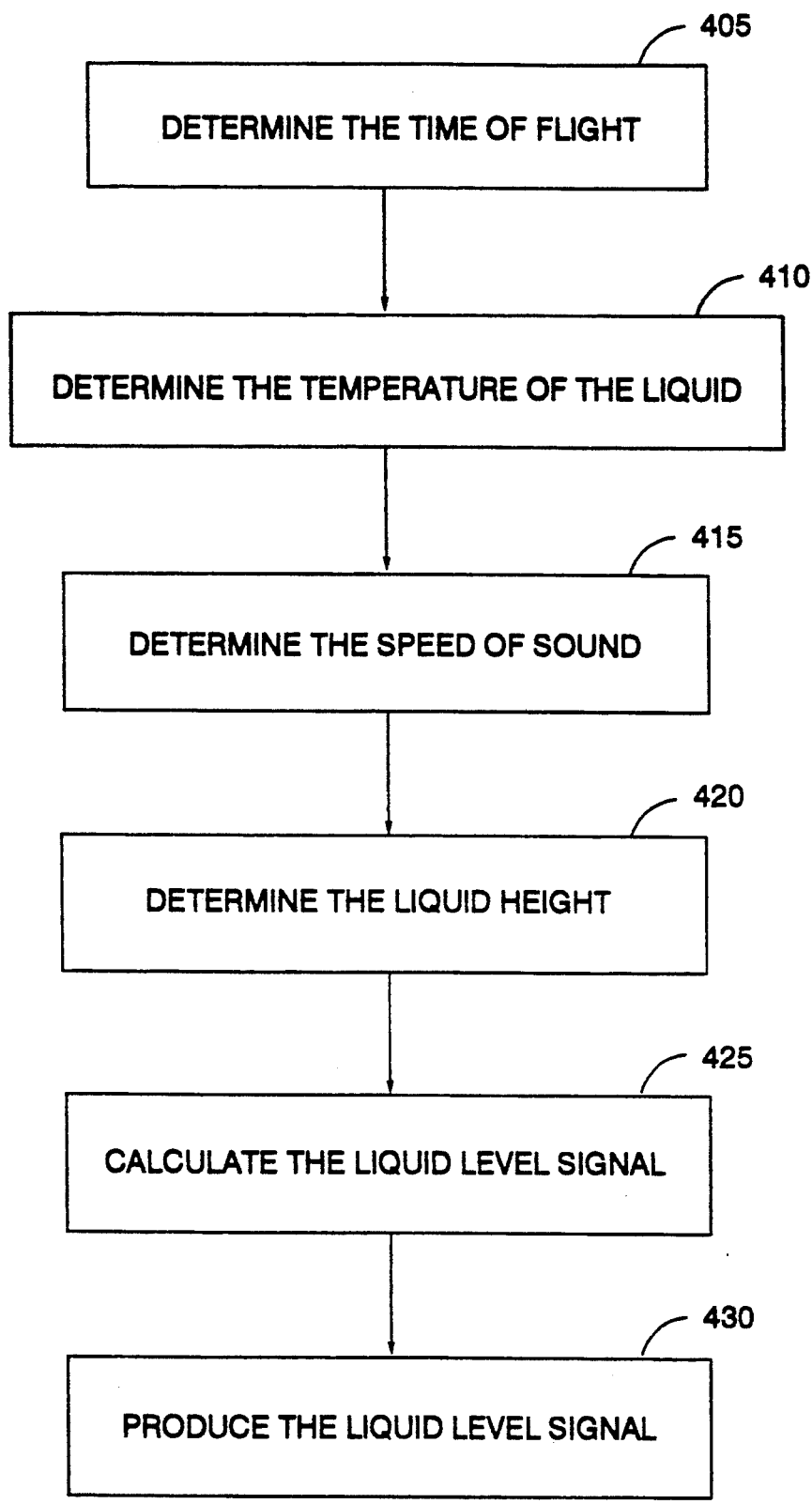
Fig_4_

ULTRASONIC FUEL LEVEL SENSING DEVICE

TECHNICAL FIELD

This invention relates generally to an ultrasonic fuel level sensing device and, more particularly, to an ultrasonic fuel level sensing device that accounts for changes in the fuel temperature.

BACKGROUND ART

Prior systems that measure the amount of fuel in a fuel tank typically use a mechanical system comprising a variable resistor associated with a float. The resistance of the variable resistor is modified depending upon the upward and downward movement of the float. However, such mechanical systems tend to be unreliable and are prone to breakage over time.

One approach to solve this problem is disclosed in U.S. Pat. No. 3,693,445 by Sven Johnson. This patent teaches a "solid state" measurement system that employs an ultrasonic transducer. The system is analogous to sonar, in that, the round trip time for a signal pulse is used to deduce distance. The system includes an ultrasonic transducer, a tube, a float and associated electronic circuitry.

The float is disposed inside the tube and floats on the surface of the liquid. The ultrasonic transducer is mounted on the bottom of the liquid tank and directs ultrasonic pulses toward the float. For example, a pulse is generated by the electronic circuitry is transmitted acoustically through the liquid by the transducer. A portion of the ultrasonic pulse is reflected back to the transducer by the float and is detected by the electronics. However the system disclosed by Johnson has several problems; a few of such problems will be discussed here.

One problem pertains to the float, which is disclosed as a hollow steel ball. As shown by FIG. 1 of the Johnson patent, the ball has a relatively small radius as compared to the diameter of the tube. Thus, the resulting spherical surface of the ball is not at a uniform distance to the ultrasonic transducer. Therefore, parts of the transmitted ultrasonic pulse will contact the ball surface at different instances in time. This causes the intensity of the reflected pulse to reduce, as well as, the reflected pulse to distort; thereby, resulting in inaccurate measurements.

Another problem pertains to the ultrasonic transducer itself. Typically, ultrasonic transducers comprise a single piezoelectric disc. As well known in the art, the disc expands in response to receiving electrical energy (transmission), and conversely the disc produces electrical energy in response to receiving mechanical energy (reception). However in order to produce accurate measurements, complex damping schemes are needed to dampen the sensor in between the transmission and reception of an ultrasonic pulse to prevent false measurements. This is especially needed when the liquid level is very low, which results in a quick round trip time. Unfortunately such damping schemes include complex electronic damping circuitry or mechanical damping configurations that add excessive cost to the system.

Finally, the system of Johnson does not teach compensating for variations in the speed of the ultrasonic pulse as the temperature of the liquid changes. It is well known that changing temperatures cause the material properties of a liquid to change; thereby, altering the speed of the ultrasonic pulse. Since vehicles are exposed to harsh environmental conditions such as extreme heat and cold, a fuel level measurement system for a vehicle must account for changes in temperature to provide accurate measurements.

The present invention is directed to overcoming one or more of the problems as set forth above.

DISCLOSURE OF THE INVENTION

In one aspect of the present invention, an apparatus for measuring the height of liquid contained in a storage tank is disclosed. A tube is disposed inside the tank. A float is disposed inside the tube and is buoyed on the surface of the liquid. An ultrasonic transducer is disposed inside the tube. The ultrasonic transducer emits ultrasonic pulses toward the float, receives the reflected ultrasonic pulses, and responsively produces an echo signal. A temperature sensor monitors the temperature of the liquid and produces a thermometric signal in response to the liquid temperature. A microprocessor receives the echo and thermometric signals, determines the speed of the ultrasonic pulse traveling in the liquid, and responsively determines the liquid height.

BRIEF DESCRIPTION OF THE DRAWINGS

For a better understanding of the present invention, reference may be made to the accompanying drawings in which:

FIG. 3 is a block diagram of the electronic circuitry associated with the preferred embodiment of the present invention; and FIG. 4 is a flowchart of a computer program associated with a preferred embodiment of the present invention.

BEST MODE FOR CARRYING OUT THE INVENTION

Figure 1:
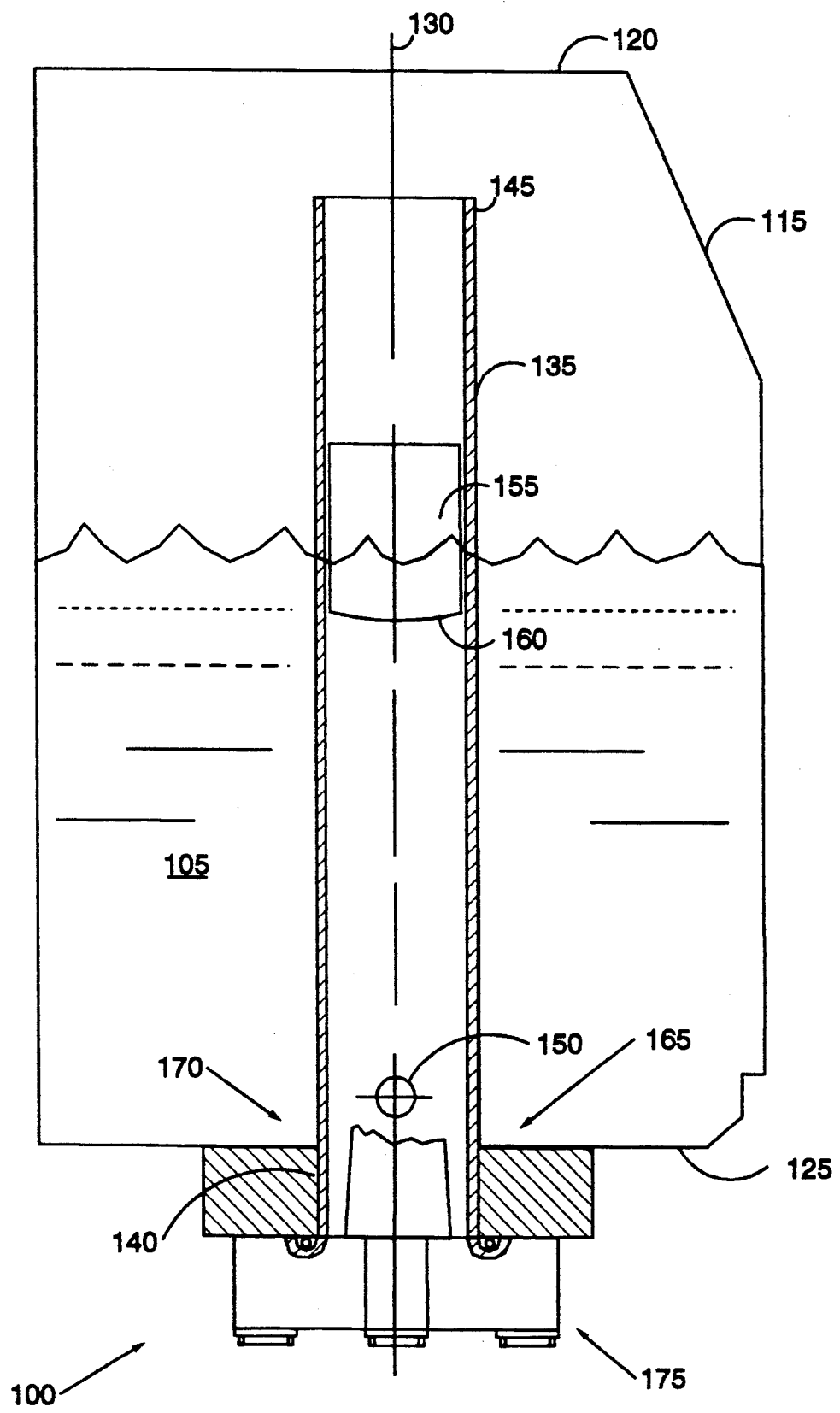
FIG. 1 is an elevational view of a preferred embodiment of the present invention.

Referring to FIG. 1, an apparatus 100 is shown for measuring the height or depth of a liquid 105 contained in a storage tank 115. The present invention is particularly well suited to measuring the amount of fuel contained in a fuel tank of a vehicle. As will be apparent from a reading of the specification, the present invention has many advantages that enables the apparatus 100 to accurately measure the fuel height in a tank of a work vehicle that is exposed to a variety of environmental conditions.

As shown the storage tank 115 has a top 120, a bottom 125 and a vertical axis 130 extending from the tank bottom 125 to the tank top 120. A tube 135 is disposed inside the tank 115 and coaxial with the vertical axis 130. More particularly, the tube 135 has one end 140 mounted to the tank bottom 125 and another end 145 is disposed adjacent the tank top 120. The tube 135 defines at least one aperture 150. The aperture 150 allows the liquid to flow inside the tube 135.

A float 155 is disposed inside the tube 135 and is closely spaced to the inner surface of the tube 135. The tube 135 maintains the float 155 in a desirable region in the tank 115. In the preferred embodiment, the float 155 is constructed of a petroleum based material. For example, one suitable material is manufactured by Rodgers Corp. of South Windham, CN, as composition Nitrophyl. Nitrophyl is a nitrite rubber ebonite formulation. The dimensions and density of the float 155 is designed so that 33% of the float is above the liquid surface while the other 67% remains below the liquid surface. This allows for good measurements while reducing float "vibration".

The end of the float that faces the tank bottom 125 defines a spherical surface 160. Advantageously, the the spherical surface 160 is designed to provide optimum reflectivity of an ultrasonic pulse. In the preferred embodiment, the spherical surface 160 includes a steel insert that has a predetermined radius, R, which is a function of the inner diameter of the tube, ID, the height of the cylindrical portion of the float, H, and the outer diameter of the cylindrical portion of the float, OD. The predetermined radius, R, is calculated according to the following equation:

$$R = \frac{OD}{2 \times SIN\left(SIN^{-1}\frac{ID}{\sqrt{H^2 + OD^2}} - SIN^{-1}\frac{OD}{\sqrt{H^2 + OD^2}}\right)}$$

The spherical surface provides a uniform surface to approaching ultrasonic pulses for all angular orientations of the storage tank 115. Thus the reflected ultrasonic pulses have a similar intensity level as the transmitted pulses, which provides for accurate measurements.

Further, the steel insert is plated with Nickel. The smooth surface provided by the Nickel plating lowers the surface tension; thereby, inhibiting adhesion of air "bubbles". Those skilled in the art will recognize that the Nickel plating enhances "wetting" and therefore uniform reflectivity.

An ultrasonic transducer 165 is disposed inside the tube 135 and is axially aligned with the vertical axis 130. The ultrasonic transducer 165 is adapted to emit ultrasonic pulses toward the float 155, which reflects the ultrasonic pulses. The ultrasonic transducer 165 then receives the reflected ultrasonic pulses and responsively produces an echo signal.

A temperature sensor 170 is also disposed inside the tube 135 and is adapted to monitor the temperature of the liquid and responsively produce a thermometric signal. For example, the temperature sensor 170 is a thermistor. A suitable temperature sensor may be provided by Sensor Scientific of Fairfield, NJ as product no. WM103C.

A processing means 175 receives the thermometric and echo signals. Advantageously, the processing means 175 determines the speed of the ultrasonic pulse traveling in the liquid in response to receiving the thermometric signal. Once the speed of the ultrasonic pulse had been determined, the processing means 175 responsively determines the height of the liquid in the tank and produces a liquid level signal representing the liquid height.

Figure 2:
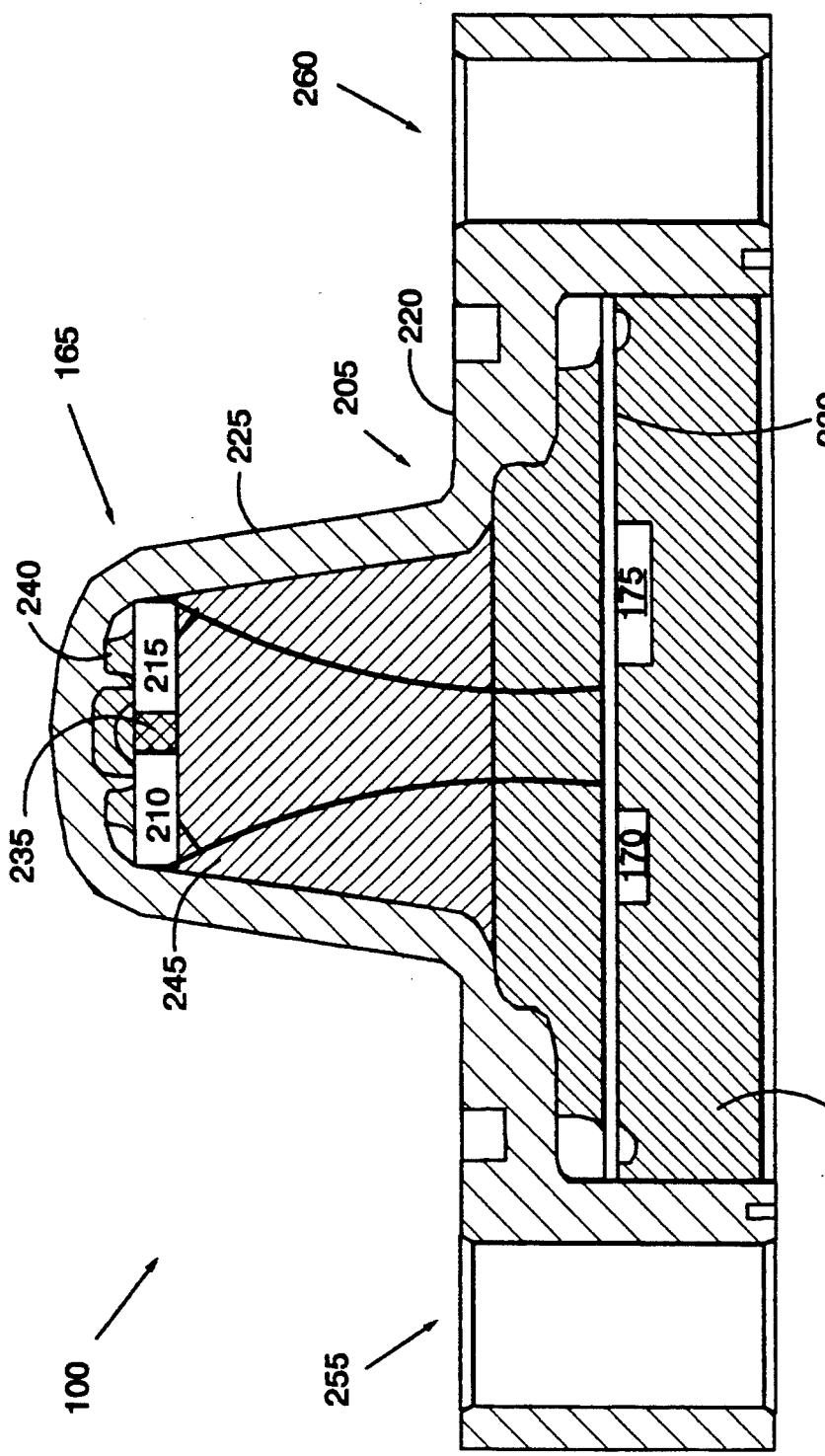
FIG. 2 is a cross sectional view of a sensor housing associated with the preferred embodiment of the present invention.

As shown by FIG. 2, the ultrasonic transducer 165 is housed in a cone shaped, sensor assembly 205. In the preferred embodiment, the ultrasonic transducer 165 includes separate transmitting and receiving elements 210,215. For example, the ultrasonic transducer 165 is a barium titanate piezoelectric disc that has been cut in half. One half of the disc 210 is the transmitter, while the other disc half 215 is the receiver. Utilizing a separate transmitting and receiving unit provides for accurate measurements without the need for complex damping circuitry.

Advantageously, the sensor assembly 205 is constructed of a thermal plastic material that is substantially transparent to the ultrasonic pulses. One suitable material is manufactured by General Electric as product no. Vaylox 357-7001. The sensor assembly 205 includes two bores 255,260 for attachment to the tank bottom.

As shown, the sensor housing 205 includes a cylindrical and a truncated conical section 220,225. The ultrasonic transducer 165 is disposed adjacent the vertex of the conical section 225. A first potting material 240 fills the area between the ultrasonic transducer 165 and the vertex. A suitable potting material is manufactured by 3M Company as composite no. 62-3532-0515-6.

A second potting material 245 fills the remaining area of the truncated conical section 225. One suitable potting material is manufactured by Magnolia Plastics, Inc of Chamblee, GA as composition no. 3017.

A circuit board 230 is rigidly attached to the cylindrical section 220. Accordingly, the temperature sensor 170 and processing means 175 are attached to the circuit board 230. Lead wires extend from the circuit board 230 to the piezoelectric elements 210,215. A third potting material 250 fills the cylindrical section 220. A suitable potting material is manufactured by Emerson & Cummings of Woburn, MA as composition no. 1265.

To prevent "cross-talk" between the two piezoelectric elements, a foam material 235 may be placed between the elements. The combination of the housing shape and composition along with the potting and foam material act to attenuate spurious noise signals. Further, the conical shape of the housing 205 allows the transducer 165 to protrude from the tank bottom 125 to permit the elements 210,215 to be separated from the tank bottom 125. Thus water, rust and other foreign material accumulating on the tank bottom 125 will not effect the transmission/reception of the ultrasonic pulses.

The processing means 175 will now be discussed in greater detail with reference to FIG. 3. In the preferred embodiment, the processing means 175 includes a programmable microprocessor 305, which is programmed to control the generation of ultrasonic or sound pulses, receive and process signals corresponding to reflected or echoed sound pulses, receive signals corresponding to the temperature of the liquid, and determine the height of the liquid in the tank 115. A suitable microprocessor is a type 68HC705C8 (68HC05) microcontroller manufactured by Motorola, Inc.

The 68HC05 is clocked by a crystal circuit at 7.28 MHz to produce 455 kHz pulse. In the preferred embodiment, a 4 cycle burst of 455 kHz pulses are provided as a transmit (XMIT) signal. Each 4 cycle burst is separated by about 25 ms. Thus, during the 4 cycle burst the transmit element produces the 455 KHz ultrasonic pulses, and during the 25 ms period, the receive element converts the reflected ultrasonic pulses into the echo signal.

A power amplifier 310 receives the XMIT signal from the 68HC05, amplifies the XMIT signal, and delivers the amplified signal to the transmit element 210. The transmit power amplifier 310 provides a predetermined 8 decibels (dB) of gain.

The receive element 215 delivers the echo signal to an amplifier 315, which amplifies the echo signal at a predetermined gain of 40 dB. The amplified signal is filtered by a 455 kHz band pass filter 320. A detector stage 325 is responsive to detect signal levels above a predetermined threshold. The output of the detector stage 325 is provided to an Analog to Digital (A/D) converter 330, which delivers digital signals to the 68HC05.

The temperature sensor 170 delivers the thermometric signal to an A/D converter 335, which delivers the digitized thermometric signal to the 68HC05.

Upon completing various calculations, the 68HC05 delivers a liquid level signal to a conventional pulse width modulated (PWM) driver 340. For example, the 68HC05 delivers the liquid level signal in serial form to the PWM driver 340, which transforms the digital liquid level signal into a PWM form in a well known manner. One suitable PWM driver is manufactured by Motorola, Inc, as part no. 68HC68WICFN. The duty cycle of the transformed liquid level signal is representative of the height of the liquid. For example the liquid being at its maximum depth corresponds to a duty cycle 95%, while a liquid being at its minimum depth corresponds to a 5% duty cycle. The PWM output driver 340 delivers the liquid level signal to a display (not shown). The display may illustrate either the liquid height or indicate a calculated percentage of liquid remaining in the tank 115. The display may be in either analog or digital form.

The present invention is adaptable to be used in a variety of tanks 115 with different shapes and heights. For example, a tank selection device 345 is provided to denote the tank height employed. In the preferred embodiment, two tank height ranges are available—a tall tank and a short tank. The tank select device 345 is a switchable between two states, one state representing a tall tank and the other state representing a short tank. The tank select device 345 delivers a tank select signal to the 68HC05 representing the particular tank size. For example, a "high" tank select signal denotes a tall tank. Accordingly, the 68HC05 makes the necessary adjustments in software and produces the liquid level signal where each 1% duty cycle represents a 1 inch liquid depth. Alternately, a "low" tank select signal denotes a short tank. The duty cycle of the liquid level signal associated with a short tank corresponds to a 2% duty cycle for each 1 inch depth of liquid.

A conventional power supply 350 provides power for operation of the circuitry in a known manner.

The construction and operation of the power amplifiers, filters, detectors and A/D convertors are well known in the art, and will not be further described.

As stated above, the 68HC05 is preprogrammed to carry-out the preferred embodiment of the present invention. Shown in FIG. 4 is a flowchart representing a computer program of the preferred embodiment of the present invention. A software program may be readily coded from these detailed flowcharts using the instruction set associated with this system, or may be coded with the instructions of any other suitable conventional microcomputer. The process of writing software code from flowcharts such as these is a mere mechanical step for one skilled in the art.

As shown by block 405, the 68HC05 receives the echo signal and determines the time of flight. The term "time of flight" or "round trip time" is recognized by those skilled in the art to represent the time elapsed between the emission of an electronic pulse and the reception of the reflected ultrasonic pulse.

At block 410, the 68HC05 receives the thermometric signal and responsively determines the temperature of the liquid. Control then passes to block 415, where the 68HC05 determines the speed of the ultrasonic pulse transmitted in the liquid. As stated earlier, the present invention is well suited to measure the height of fuel contained in the fuel tanks of vehicles. Typically vehicles are exposed to large variations of temperature. As is well known, the speed of sound traveling in fuel, e.g. diesel fuel, changes as the temperature changes. Thus to provide accurate measurements, the present invention accounts for such temperature variations in the fuel.

Memory is provided for storage of a lookup table to handle the mathematical computation associated with determining the speed of sound in the liquid. The lookup table stores a plurality of values that represents the speed of sound in the liquid at a plurality of temperature values. The number of data values stored in memory is dependent upon the desired precision of the system. The 68HC05 selects one of the plurality of stored speed values in response to the magnitude of the thermometric signal. Interpolation may be used to determine the speed of sound in the event that the measured values fall between the discrete values stored in memory. Those skilled in the art will recognize that employing a lookup table is quicker than programming the 68HC05 to perform the computations.

The input for the lookup table is shown in Table 1. Table 1 is shown for exemplary purposes only, and the actual values will be dependent on the particular type of liquid stored. The values illustrated are shown for #2 diesel and kerosine. As may be apparent to those skilled in the art, it may be desirable to average the values to conserve memory space or reduce error in the event that both types of fuels are utilized.

TABLE 1

| TEMPERA- | VELOCITY/SPEED OF SOUND | |
|---|---|---|
| TURE DEGREES C. | #2 DIESEL FUEL METERS/SECOND | KEROSINE METERS/SECOND |
| −40 |  | 1552 |
| −30 |  | 1517 |
| −20 |  | 1484 |
| −10 |  | 1444 |
| 0 |  | 1399 |
| 10 | 1371 | 1364 |
| 20 | 1324 | 1324 |
| 30 | 1277 | 1286 |
| 40 | 1241 | 1262 |
| 50 | 1216 | 1222 |
| 60 | 1189 | 1179 |
| 70 | 1166 | 1139 |
| 85 | 1132 | 1093 |

At block 420, the 68HC05 calculates the liquid height. For example the liquid height is calculated by the following equation:

$$\text{Liquid Height} = (\text{Speed of Sound} * \text{Time of Flight}) / 2$$

Since the time of flight includes the time for the ultrasonic wave to travel up the tube to the float and back down the tube, the total value is divided by two.

At block 425, the 68HC05 receives the tank select signal and scales the magnitude of the liquid level signal to be representative of the denoted tank height. Further, the 68HC05 calculates the proper "offset" of the liquid level signal so that a 5% duty cycle is associated with a minimum fuel height and a 95% duty cycle is associated with a maximum fuel height.

At block 430 the 68HC05 delivers the liquid level signal to the PWM output driver 340.

INDUSTRIAL APPLICABILITY

The present invention is particularly well suited for work vehicles that are exposed to a variety of environmental conditions. Such vehicles traverse various types of rugged terrain that may cause the storage tank 155 to tilt up to 45° in any direction. Moreover, the vehicles may be exposed to a wide range of temperatures. For example, the vehicle may operate in such extreme cold temperatures as $-40°$ C. to such hot temperatures as $+85°$ C. The present invention is designed to operate and provide accurate measurements in the above conditions. The operation of the present invention will now be discussed in relation to the associated Figs.

The XMIT signal produced by the 68HC05 causes the ultrasonic transducer 165 to generate an ultrasonic pulse in the fuel. The ultrasonic pulse travels up the tube 135 and is reflected by the float 155. The tube 135 tends to minimize the spherical spread of the ultrasonic pulse. The echo from the float 155 moves back down the tube 135 and is sensed by the transducer 165. The transducer 165 produces the echo signal in response to receiving the reflected ultrasonic pulse. The echo signal is processed by the electronic circuitry and is delivered to the 68HC05 is digital form.

Additionally, the temperature sensor 170 produces the thermometric signal representing the temperature of the fuel. The electronic circuitry digitizes the thermometric signal and delivers the digitized thermometric signal to the 68HC05. The 68HC05 determines the speed of the ultrasonic pulse traveling in the fuel and responsively calculates the fuel depth. The liquid level signal produced by the 68HC05 is delivered to a display to show the height of fuel in the fuel tank 115.

Other aspects, objects and advantages of the present invention can be obtained from a study of the drawings, the disclosure and the appended claims.

We claim:

1. An apparatus for measuring the height of liquid contained in a storage tank, the storage tank having a top, a bottom and a vertical axis extending from the tank bottom to the tank top:
    a tube having opposed ends, an interior diameter, ID, and an inner and outer surface, and being disposed inside the tank coaxial with the vertical axis, one end of the tube being mounted to the tank bottom and the other end being disposed adjacent the tank top;
    a float having a top portion and a bottom portion being separated by a cylindrical portion and being disposed inside and closely spaced to the inner surface of the tube, the bottom portion of the float defining a spherical surface, wherein the cylindrical portion of the float has a height, H, the spherical surface has a predetermined radius, R, which is at least a function of the interior diameter of the tube and the height of the cylindrical portion of the float, and the float is buoyed on the surface of the liquid;
    an ultrasonic transducer being disposed inside the tube and axially aligned with the vertical axis, the ultrasonic transducer being mounted to the tank bottom and adapted to emit ultrasonic pulses toward the bottom portion of the float, receive the reflected ultrasonic pulses, and responsively produce an echo signal;
    a temperature sensor being disposed adjacent the tank and adapted to monitor the temperature of the liquid, the temperature sensor producing a thermometric signal in response to the liquid temperature; and
    processing means for receiving the echo and thermometric signals, determining the speed of the ultrasonic pulse traveling in the liquid, and responsively determining the height of the liquid in the tank, the processing means producing a liquid level signal representing the liquid height.

2. An apparatus, as set forth in claim 1, wherein the processing means includes a memory means for storing a plurality of values that represents the speed of sound in the liquid at a plurality of temperature values, the processing means selecting one of the plurality of stored speed values in response to the magnitude of the thermometric signal.

3. An apparatus, as set forth in claim 2, wherein the liquid level signal is pulse width modulated having a duty cycle representative of the liquid height.

4. An apparatus, as set forth in claim 3, wherein the processing means includes a programmable microprocessor.

5. An apparatus, as set forth in claim 4, including a tank select device, the tank select device producing a signal representing one of a plurality of storage tank heights, the processing means including means for receiving the tank select signal and scaling the magnitude of the liquid level signal to be representative of the one tank height.

6. An apparatus, as set forth in claim 5, wherein the predetermined radius, R, is also a function of an outer diameter of the cylindrical portion, OD, and is calculated according to the following equation:

$$R = \frac{OD}{2 \times \text{SIN}\left(\text{SIN}^{-1}\frac{ID}{\sqrt{H^2 + OD^2}} - \text{SIN}^{-1}\frac{OD}{\sqrt{H^2 + OD^2}}\right)}.$$

7. An apparatus, as set forth in claim 6, wherein the spherical surface of the float includes a steel insert plated with Nickel 8. An apparatus, as set forth in claim 7, wherein the float is constructed of a petroleum based material.

9. An apparatus, as set forth in claim 8, wherein the ultrasonic transducer includes separate transmitting and receiving elements.

10. An apparatus, as set forth in claim 9, including a sensor housing having a cylindrical and a truncated conical section, the ultrasonic transducer being disposed within the truncated conical section and adjacent a vertex of the truncated conical section, the processing means and temperature sensor being disposed within the cylindrical section.

11. An apparatus, as set forth in claim 10, wherein the sensor housing is constructed of a thermal plastic material that is substantially transparent to the ultrasonic pulses.

* * * * *